United States Patent
de Bonet (10) Patent No.: US 9,525,637 B1
(45) Date of Patent: Dec. 20, 2016

(54) SYSTEM AND METHOD FOR LOCATION BASED INTERACTION WITH A DEVICE

(75) Inventor: Jeremy S. de Bonet, Windham, NH (US)

(73) Assignee: MobiTV, Inc., Emeryville, CA (US)

( * ) Notice: Subject to any disclaimer, the term of this patent is extended or adjusted under 35 U.S.C. 154(b) by 115 days.

(21) Appl. No.: 13/171,367

(22) Filed: Jun. 28, 2011

Related U.S. Application Data (63) Continuation of application No. 11/439,543, filed on May 24, 2006, now Pat. No. 8,024,186.

(60) Provisional application No. 60/683,842, filed on May 24, 2005, provisional application No. 60/683,843, filed on May 24, 2005.

(51) Int. Cl.
 *H04L 12/853* (2013.01)
 *H04L 29/06* (2006.01)

(52) U.S. Cl.
 CPC ..... *H04L 47/2416* (2013.01); *H04L 29/06176* (2013.01); *H04L 65/4092* (2013.01)

(58) Field of Classification Search
 CPC .............. H04L 29/06448; H04L 67/18; H04L 29/06462; H04L 29/06027; H04L 47/801; H04L 47/806; H04L 47/826; G06F 17/3087
 See application file for complete search history.

(56) References Cited

U.S. PATENT DOCUMENTS

| | | | |
|---|---|---|---|
| 6,421,001 B1 | 7/2002 | Durst et al. | |
| 6,772,213 B2 | 8/2004 | Glorikian | |
| 6,895,057 B1* | 5/2005 | Balachandran et al. | 375/259 |
| 7,139,820 B1 | 11/2006 | O'Toole, Jr. et al. | |
| 2002/0068599 A1 | 6/2002 | Rodriguez et al. | |
| 2002/0099842 A1* | 7/2002 | Jennings et al. | 709/231 |
| 2002/0112003 A1* | 8/2002 | Glorikian | 709/203 |
| 2002/0142268 A1 | 10/2002 | Dutta et al. | |
| 2005/0027449 A1 | 2/2005 | Marsh | |
| 2005/0071669 A1 | 3/2005 | Medvinsky et al. | |
| 2005/0136983 A1 | 6/2005 | Agapi et al. | |
| 2005/0266833 A1 | 12/2005 | Walker | |
| 2006/0167985 A1 | 7/2006 | Albanese et al. | |
| 2006/0265737 A1* | 11/2006 | Morris | 726/3 |
| 2007/0167175 A1 | 7/2007 | Wong et al. | |

OTHER PUBLICATIONS

Office Action mailed Mar. 19, 2009 for U.S. Appl. No. 11/439,543.
Final Office Action mailed Oct. 23, 2009 for U.S. Appl. No. 11/439,543.
Office Action mailed Mar. 3, 2010 for U.S. Appl. No. 11/439,543.

(Continued)

*Primary Examiner* — Jackie Zuniga Abad (74) *Attorney, Agent, or Firm* — Kwan & Olynick LLP (57) ABSTRACT

Systems and methods for interacting with a device based on the location of the device are disclosed. Embodiments of these systems and methods may allow a content delivery system to provide certain content to a device, or restrict certain content from being delivered to the device, based on the location of the device. When a user requests certain content the location of the device may be determined and compared against an access control list defining a set or rules regarding that content to determine if the requested content may be accessed from that location. Similarly, the location of a device may be utilized to tailor the delivery of content to a device.

18 Claims, 4 Drawing Sheets

(56) References Cited

OTHER PUBLICATIONS

Final Office Action mailed Aug. 18, 2010 for U.S. Appl. No. 11/439,543.
Office Action mailed Dec. 29, 2010 for U.S. Appl. No. 11/439,543.
Notice of Allowance mailed May 26, 2011 for U.S. Appl. No. 11/439,543.

* cited by examiner

SYSTEM AND METHOD FOR LOCATION BASED INTERACTION WITH A DEVICE

CROSS-REFERENCE TO RELATED APPLICATIONS

This application is a continuation under 35 U.S.C. §120 and claims priority to U.S. application Ser. No. 11/439,543, entitled "System and Method for Location Based Interaction With a Device," filed May 24, 2006, which claims benefit of priority under 35 U.S.C. §119 to U.S. Provisional Patent Application No. 60/683,842, entitled "System and Method for Location Based Channel Restriction" filed May 24, 2005 and U.S. Provisional Patent Application No. 60/683,843, entitled "System and Method for Location Based Interaction" filed May 24, 2005, the entireties of which are incorporated herein by this reference for all purposes.

TECHNICAL FIELD OF THE INVENTION

The invention relates in general to content delivery, and more particularly, to methods and systems for location based interactions within a content delivery system.

DETAILED DESCRIPTION

The use of computer networks to store data and provide information to users is increasingly common. A microcosm of this phenomenon can be seen in the prevalence of the internet. The internet is used to distribute a wide variety of content to users, including video, audio, text, images etc. Each of these types of content may, in turn, be distributed in a wide variety of formats. These various types of content may be themselves packaged in a variety of payload formats and delivered via a whole host of application and transmission protocols.

As the general populous becomes more mobile, however, it is increasingly desired to access this content regardless of location. Thus, over the past few years there has been a marked proliferation of personalized communication devices such as mobile phones, laptop computers, and personal digital assistants (PDAs). The popularity of these devices is based in no small part on their ability to access a wide variety of information, regardless of location, by virtue of wireless communication.

Consequently, wireless communication systems are utilized to provide an ever growing portion of the communications capacity currently available to users, despite the additional technological impediments faced in implementing a wireless communication system, as compared to a wireline system. Though a whole host of issues crops up in wireless communication systems, an often overlooked issue is how of the mobility of these various devices to which content is being delivered may affect the content that is actually delivered to the device, or a content provider's ability to restrict, or deliver, certain content based on the location of the device.

For example, in many cases a local sports team may be "blacked out" in its home city or surrounding area, such that the inhabitants of the home teams metropolitan area are encouraged to go to the stadium to see the game. Thus, it is desired that no one in a certain geographical area be able to view the game. In certain wireline or wireless system (e.g. television or radio) this is not so problematic, the local affiliates do not broadcast the game, and stations in other areas which are broadcasting the game are limited by the geographical limitations of their respective broadcast mediums. In the Internet space an IP address may be correlated with a location within a degree of certainty, for example content deliverers on the Internet have an IP map and they know that if an IP address is within a certain geographical area. If a piece of requested content is restricted with respect to a determined location, access to the content will be denied. Consequently, the geographical area which is to be "blacked out" is kept from receiving a broadcast of the sporting event.

As can be seen, however, certain issues may present themselves with respect to A similar situation in the context of a content delivery system where content can be delivered from a variety of disparate or geographically distant sources. For example, suppose a user at a mobile device can request content from one or more servers which are capable of providing content from disparate source located in one or more geographical regions. In this case, a user may request a broadcast of a television station located in a different geographical area on which the sporting event is being televised and thus may view the sporting event even though the user may be located in the geographical area in which the sporting event is supposed to be 'blacked out".

In addition to restriction of content delivered to users of these mobile devices, it may also be desired to interact (e.g. deliver certain content) to these device based on their location as well. For example, informing a user of a mobile device of inclement weather when the device is located in a certain area, or delivering local affiliate stations to a device based on the location of the device.

Thus, a need exists for content delivery systems which can perform interaction based on the location of the various devices to which content may be delivered.

SUMMARY OF THE INVENTION

Systems and methods for interacting with a device based on the location of the device are disclosed. Embodiments of these systems and methods may allow a content delivery system to provide certain content to a device, or restrict certain content from being delivered to the device, based on the location of the device. When a user requests certain content the location of the device may be determined and compared against an access control list defining a set or rules regarding the content to determine if the requested content may be accessed from that location. If the content may be accessed from this location the content may be delivered, otherwise an error message, or another option, may be delivered to the device. Similarly, the location of a device may be utilized to tailor the delivery of content to a device, such that content may be provided to a user based on the user's location, in certain cases with little or no stimulus from the user.

In one embodiment, a device may request certain content from a content delivery device. The content delivery system may then determine the location of the device, either by accessing a stored location associated with the device or sending a set of instructions to the device, where executing the set of instructions on the device results in a determination of the location of the device. Content can then be provided to the device based on this location.

In another embodiment, the provided content may be the requested content if it is determined that the requested content is suitable for the location.

In other embodiment, if the requested content is not suitable for the location the provided content may comprise a variety of things such as, an offer to purchase the requested content, an error message, alternative content, etc.

Aspects and embodiments of the invention will provide the technical advantage of allowing users on devices to request and receive a variety of content while allowing delivery of this content to be restricted based on. the location of the user, such that rules regarding the distribution or viewing of this content may be adhered to irrespective of the mobility of the users themselves.

Similarly, embodiments of the present invention may allow content to be tailored or delivered to a user based on the user's location. This content may take a variety of forms and correspond to a wide variety of applications. These applications may utilize the user's location to deliver weather alerts, amber alerts, emergency broadcast system messages, etc. pertaining to the location. The content may also be used to notify or otherwise inform a user of other devices in geographical proximity, for example to implement a dating application, a family or friends notification service, etc. These various applications may deliver content to a user based on his location with little to no the involvement by the user (e.g. a user may not have to specify his location for the applications to deliver tailored content).

Furthermore, the location of these devices may be determined with little or no intervention from a user of the device. Not only does this allow content to be restricted, or provided to, a device with little or no involvement of a user, it also substantially prevents a user from circumventing restrictions placed on content which may be provided to him by providing false locations, etc.

Embodiments of the systems and methods of the present invention may also be utilized substantially regardless of the environment of the device on which the architecture is being implemented. For example, embodiments of the systems and methods of the present invention may be implemented on J2ME devices, C++ devices, Brew devices, Symbian devices, Python devices, etc.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

A few terms are defined or clarified to aid in understanding the descriptions that follow: a device may be any sort of apparatus which can receive and display data including mobile phones, PDAs, laptop computers and the like.

A format is a way of arranging, organizing, or representing data, usually using a defined standard such as MPEG or motion JPEG. For purposes of this application, formats will be understood to be distinct if characteristics of the represented data differ in any manner. Additionally the same standard at two different rates will be understood to mean two distinct formats. For example, high framerate motion JPEG would be a distinct format from low framerate motion JPEG. Furthermore, augmenting a defined standard with additional information will be understood to constitute a distinct format. For example, augmenting an MPEG representation of video data with closed captioning information would be a distinct format from video data represented in the MPEG format alone. Compressed video data will also be understood as distinct from its uncompressed equivalent. For example, video data compressed with MPEG will be understood as distinct format from identical uncompressed raw video data. It will be obvious to those of ordinary skill in the art that for purposes of this application, distinct formats may be created in an almost endless variety of ways, such as varying resolution, screen size, sampling rate, and the like.

A packet is intended to mean any set of data, including a set of data operable or configured for transmission.

Before describing embodiments of the present invention it may be helpful to depict an exemplary architecture which may be utilized in conjunction with various embodiments of the present invention. Though the exemplary embodiment described below utilizes embodiments of the present invention in a media bridge designed to convert broadcast media such as television into a variety of formats for delivery over, a wireless communication network, those skilled in the art will appreciate that these same systems and methods may be employed for a myriad number of other uses and applications, such as delivering internet content over a wireline system, or other type of network topology. Additionally, it will be understood that these same systems and methods, or any subset, can be implemented in a variety of software systems, computer programs, hardware, and any combination thereof.

These exemplary architectures include methods and systems for data formats which facilitate the encapsulation, transmission, reception, decomposition and processing of heterogeneous sets of data. Data may be encoded in one of these data formats, and sent to a recipient, which decodes the data format and renders the data. These data formats may consist of the concatenation of a set of commands, each of these commands in turn composed of a tag, length and a payload. Furthermore, these data formats may provide a compact way to deliver information which allows the rendering of video, images, caption audio as well as user interaction functionality, while simultaneously reducing the computational complexity required of the recipient to decode the data format and render the varying types of data. These data formats may be ideally suited for distributing data in a client-server architecture where the encoding server is powerful relative to the many clients.

Figure 1:
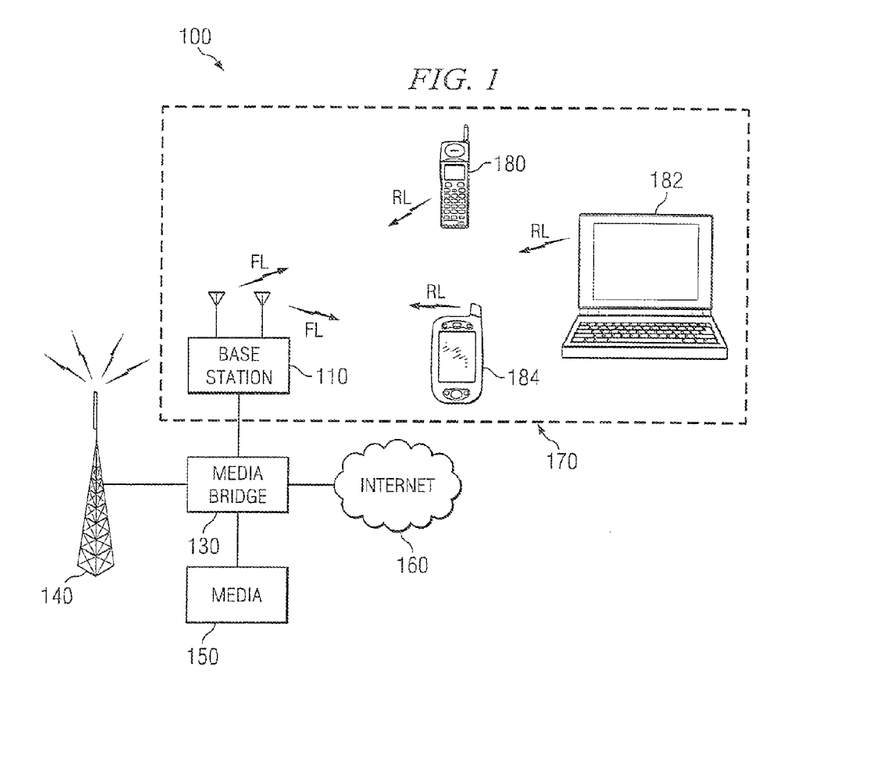
FIG. 1 is a block diagram of an exemplary system for use with embodiments of the present invention.

Turning now to FIG. 1, a diagram illustrating the structure of an exemplary communications system for utilization with embodiments of the present invention is shown. As depicted in this figure, this system 100 comprises a media bridge 130 for interfacing between different types of content systems 140, 150; 160 and one or more wireless (or potentially wireline) communication networks 170. Content systems 140, 150, 160 may be broadcast media such as television or radio, other audio or video data, such as a video feed from a DVD player, or the Internet.

Wireless communication network 170 is in turn composed of base station 110 that is configured to communicate with a plurality of mobile devices (devices) 180, 182, 184. Mobile devices 180, 182, 184 may, for example, be cellular telephones, laptop computers, personal information managers (PIMs or PDA), or the like that are configured for wireless communication. These devices 180, 182, 184 may be running software designed for use with embodiments of the present invention. It should be noted that these devices 180, 162, 184 need not actually be "mobile," but may simply communicate with base station 110 via a wireline or wireless link. Base station 110 transmits data to mobile devices 180, 182, 184 via corresponding forward link (FL) channels, while mobile devices 180, 182, 184 transmit data to base station 110 via corresponding reverse link (RL) channels.

Users of mobile devices 180, 182, 184 may wish to have content from content sources 140, 150, 160 delivered to them. This may be problematic, however, as delivery of much of this content typically requires large amounts of data to be delivered over a high-reliability high-bandwidth connection. Additionally, even if wireless network 170 is such a high-bandwidth network, mobile devices 180, 182, 184 may experience temporary periods of low-bandwidth connection to base station 110, or may be incapable of handling the complexity of such content. Media bridge 130 alleviates these problems by delivering tailored content from content-source 140, 150, 160 to each individual mobile device 180, 182, 184.

Media bridge 130 may employ embodiments of the present invention to package content from content sources 140, 150, 160 for delivery to mobile devices 180, 182, 184 in a data format which is compact, and simplifies the tasks of decoding and rendering the data format performed by mobile devices 180, 182, 184. Streaming content from .a. content source 140, 150, 160 is fed into media bridge 130, at which point media bridge 130 may capture and digitize the incoming content if the data is not already in a digital format. This digitized data may be divided up into serialized portions and converted to a wide variety of formats. This data can then be encapsulated in data portions with a certain data format, these data portions encapsulated in packets and a particular series of packets may be sent to base station 110 for delivery to mobile device 180, 182, 184 depending on criteria associated with that particular device 180, 182, 184. It should be noted that the mobile devices 180, 182, 184 and system components in this figure are exemplary and other systems may comprise other types and other combinations of devices.

Figure 2:
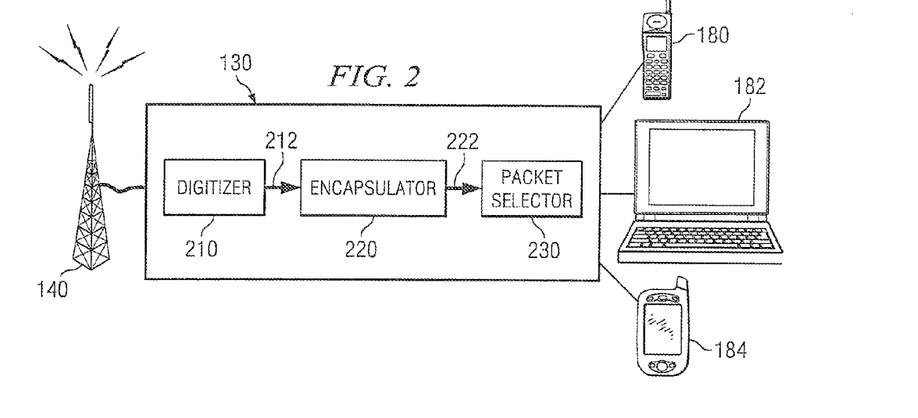
FIG. 2 is a flow diagram of an embodiment of the exemplary system for use with the present invention.

Embodiments of the steps involved in the distribution of data by media bridge 130 are depicted in more detail in FIG. 2. Content coming from media source 140 which is to be delivered to a device 180 may be in an analog format. This analog content, such as a television signal, radio broadcasts or video game data, may be captured using automatic or manual capture methods, and converted to a digital signal (STEP 210). One of ordinary skill in the art will understand the many and varied ways to accomplish this capture and analog to digital conversion (STEP 210). In one embodiment, raw TV signal 140 may be connected to a TV tuner capture card, which in turn captures incoming analog TV signal 140. This analog signal 140 may be converted to a digital signal via the use of a standard analog to digital converter of the, type that are well known in the art.

The resulting digital data 212 may be converted to a variety of formats and encapsulated in packets (STEP 220) in order to facilitate delivery of data 2.12 to device 180. Packets of this data 222 may then be selected for delivery (STEP 230) to device 180 based upon a set of Criteria.

Figure 3:
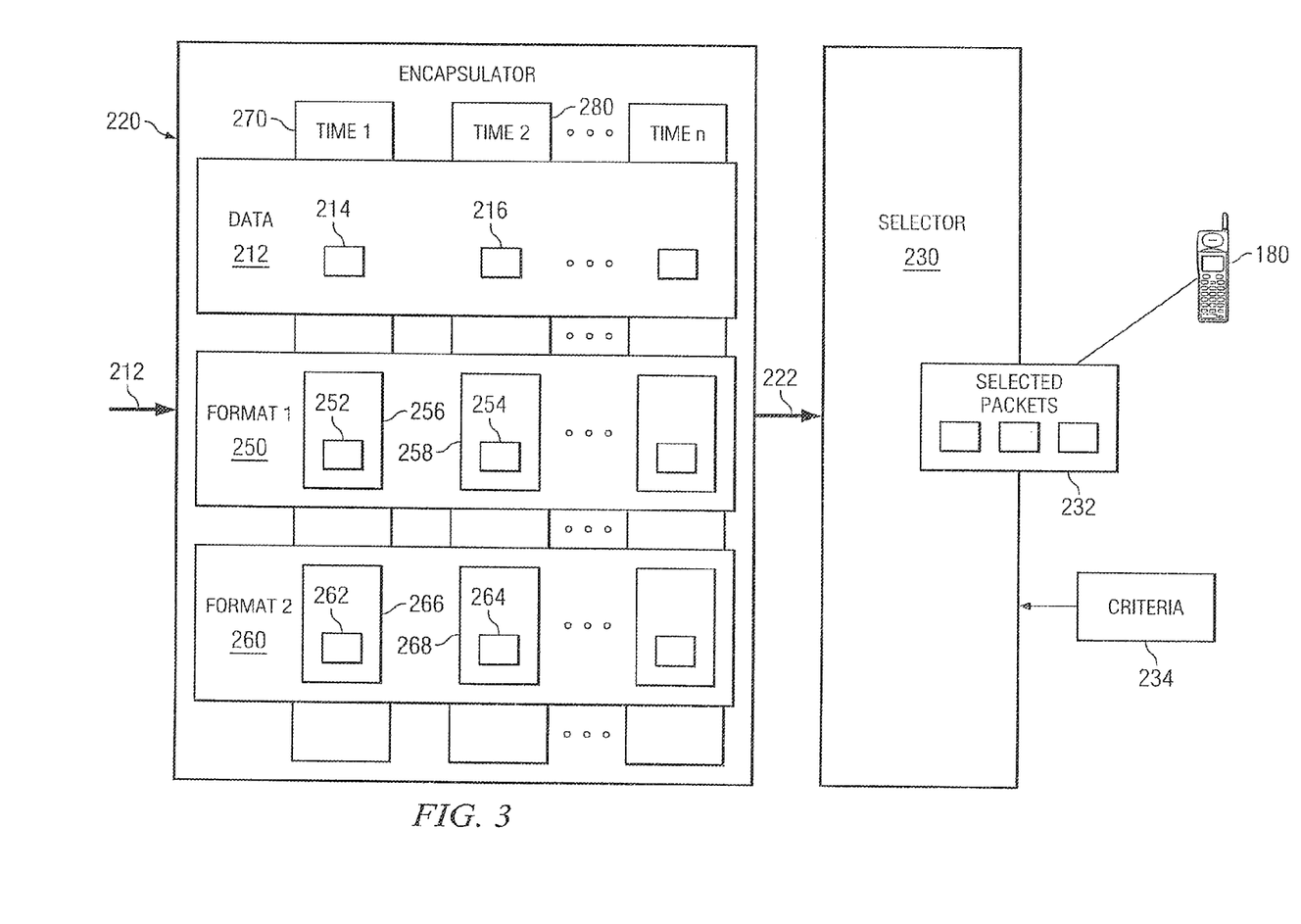
FIG. 3 is a depiction of an embodiment of converting portions of data, encapsulating these portions in packets and selecting packets to be delivered to a device.

Moving now to FIG. 3, embodiments of the process for encapsulating data (STEP 220) are depicted in greater detail. Encapsulation process (STEP 220) may in turn include separating original data 212 into portions 214, 216 and converting those portions 214, 216 into a variety of different formats 250, 260. The resulting data portions 252, 254, 262, 264 of data in different formats. 250, 260 cover time periods 270, 280 corresponding to portions 214, 216 of original data 212. In other words, a portion (chunk) 252 of data in one format 250 covers the same time period 270 of original data 212 as corresponding portion 262 in another format 260.

To elucidate more clearly, if incoming original data 212 is digitized video data, original data 212 may be divided into portions 214, 216 which cover the first 20 seconds of the video represented by original data 212, with one portion 214 representing the first 10 seconds (time period one 270) and another portion 216 representing the second 10 seconds (time period two 280). Portions 214, 216 may then be converted to two different formats 250, 260. The resulting data portions 252, 262 corresponding to original portion 214 represent the same first 10 seconds (time period one 270) of original data 212, albeit in two different formats 250, 260. Similarly, data portions 254, 264 corresponding to original data portion 216 represent the second 10 seconds (time period 2 280) of original data 212 in two different formats 250, 260.

Additionally, during this conversion process each portion 252, 254, 262, 264 of the data may be augmented. For example, information regarding closed captioning may be added to a portion of video data represented in the MPEG format, billing information may be added to a portion of a web page represented in HTML, Java content may be added to a portion of the data to provide interactive controls to users of mobile device 180, etc. These portions 252, 254, 262, 264 of data may also be optimized for delivery to a device 180 through the use of compression algorithms and the like.

After original data 212 is separated into portions 214, 216 and converted into different formats 250, 260, the resulting data portions 252, 254, 262, 264 may then be encapsulated in packets 256, 258, 266, 268 for delivery to device 180. Typical file formats for the encapsulation of data include layers dedicated to transmission protocols, application protocols, payload formats, and content formats. In many cases, data portions 252, 254, 262, 264 may be larger than may be placed in the payload of various types of packets 256, 258, 266, 268. In cases such as these, a data portion 252, 254, 262, 264 may be split across multiple packets 256, 258, 266, 268, such that more than one packet 256i, 258, 266, 268 may be utilized to deliver a single data portion. In some embodiment, by utilizing reliable data transport protocols such as TCP/IP to deliver packets 256, 258, 266, 268 to a device 180, the in order delivery of packets 256, 258, 266, 268 comprising a portion of data 252, 254, 262, 264 at an application or device may be substantially guaranteed. By utilizing data portions 252, 254, 262, 264 that may be bigger than packets 256, 258, 266, 268 a higher effective data rate may be achieved. Additionally, it may foist processing and ordering duties onto lower levels of a protocol stack, which may be more efficient at these duties than higher level layers of the protocol stack.

In addition to allowing data portions to be tailored for various devices, augmented, compressed etc., the data format of data portions 252, 254, 262, 264 could also be used to deliver commands to the devices 180, 182, 184 which are to process, control, and render the data contained within those packets 256, 258, 266, 268. In one embodiment, the various portions of data 252, 254, 262, 264 may be a data format which allows the efficient encapsulation, transmission, reception, and decomposition of heterogeneous data. A data portion 252, 254, 262, 264 may contain commands which have identical easy to decode structures, and which may be evaluated and executed in the order in which they are encoded, greatly simplifying the evaluation and execution of the commands, the encapsulation of portions 252, 254, 262, 264 in packets 256, 258, 266, 268, the delivering of packets 256, 258, 266, 268 to device 180, and the rendering of the data contained within a data portion 252, 254, 262, 264 by device 180.

More specifically, during encapsulation (STEP 220), each portion of data 252, 254, 262, 264 is evaluated to produce a set of commands, which when executed in a certain order are operable to instruct a decoding or rendering device to present the respective portion of data 252, 254, 262, 264. This set of commands can then be concatenated to form the respective data portion 252, 254, 262, 264. The set of commands of a data portion 252, 254, 262, 264 may then be encapsulated into one or More packets 256, 258, 266, 268 for delivery to device 180. All commands may have the same structure, and the order of command evaluation or execution may be determined by the order in which the commands are concatenated (and possibly the side effects of the evaluation). Each command may in turn be composed of a tag or command identifier, a length indicator and a data payload. Thus, if a data portion 252, 254, 262, 264 is delivered using multiple packets 256, 258, 266, 268 it makes little differences where the set of commands comprising the data portion 252, 254, 262, 264 is split or divided for inclusion in the payload of packets 256, 258, 266, 268, if a reliable protocol is to be utilized to deliver packets 256, 258, 266, 268.

For example, the Bakus-Naur Form (BNF) of one embodiment of this type of data format is:
    encapsulation:=<command>*
    command:=<tag><length><payload>
    tag:=<byte>
    length:=[0-9] {12} (an integer in %012d format)
    payload:=<bytes>{<length>}

In this embodiment, a command identifier or tag is a character with an associated or mnemonic relationship to the functionality of the command. Using the example above, the command identifier is a single byte character: tag:=<byte>. An exemplary embodiment of a set of commands and their associated command identifiers is presented in Appendix A. In other embodiments, command identifiers can also be: multiple bytes, partial bytes (fewer than 8 bits) or strings.

Continuing with the above embodiment, a payload length indicator (length) is represented as a fixed length, ASCII encoded, zero prefix number. Using the example above, the payload length is twelve digits: length:=[0-9] {12} (an integer in %012d format). For example, a number of 000000002500 would indicate a payload which is 2500 bytes.

It will be apparent to those of skill in the art that payload length could also be specified using many numbering schemas, including: fixed length ASCII representation in decimal (base 10); fixed length ASCII representation in hexadecimal (base 16); fixed length ASCII representation in some other base; variable length ASCII representation, where a fixed length number is specified which specifies the length of payload representation (for example: if the length-length is identified with 1 ASCII digit, 217 would specify a payload length of 17, and 3568 would specify a payload length of 568, as in the fixed length case, this can be done using any base); fixed length binary representation, in either little-endian or big-endian order (e.g. different methodology for representing numbers in a compute based system when human readability is not required) or variable length binary representation, where the first byte (or fixed number of bytes, or bits) establishes how many of the following bytes (or bits) encode the payload length.

Returning to the above embodiment, a data payload (payload) is composed of a series of bytes whose length is indicated by the payload length indicator. Using the above example, the data payload is: payload:=<bytes>{<length>}.

An example may be useful in explaining this specific embodiment in more detail. Suppose a portion of data 252, 254, 262, 264 is represented by the following XML code:
    <image src="image0.jpg"/>
    <text>this is a caption 0</text>
    <display I>
    <pause duration=1000/>
    <image src="mage1.jpg" h
    <display />
    <pause duration=3000/>
    <text>this is a caption 1</text>
    <display />
    <pause duration=4000/>
    <image src="image2.jpg"/>
    <text>this is a caption 2</text>
    <display />
    <pause duration=6000/>

This XIII, code may be encapsulated in the embodiment of the data format explained above as follows:

I000000012345 [ . . . 12345 image bytes
here . . . ]C000000000019this is a
caption0D000000000000P000000000012000000001-
00010000000123 45[ . . . 12345 image bytes
here    .    .    .    ]D000000000000P0000000-
00012000000003000C0000000000 19this is a caption
1D000000000000P000000000012000000004001000-
000012345[ . . . 1 2345 image bytes
here . . . ]C000000000019this is a caption
2D000000000000P000000000012000000001000

It will be apparent that many variations on the above data format may be utilized as well. For example, in some embodiments the order of the command identifier and payload length may be in different orders, while in other embodiments the length of the command identifier could be included in the payload length.

Referring again to FIG. 3, after the incoming data is digitized (STEP 210), converted to a variety of formats and encapsulated in packets (STEP 220), packets 232.*may* be selected for delivery to a device 180 based on a set of criteria 234 (STEP 230). A user of device 180 may wish to obtain certain content. That content may be digitized (STEP 210) and encapsulated into packets of varying formats (STEP 220). Packets 232 may then be selected to be delivered to device 180 based on a set of criteria (STEP 230).

These criteria 234 may include user influenced factors such as bandwidth availability, the type of device 180, time of day, user account information or subscription service, and user age and preferences. Criteria 234 may also include external factors such as the network configuration, the CPU and databases being utilized in the system, and channel availability. Criteria 234 may be updated dynamically as packets 232 are selected to be delivered to device 180. Additionally, criteria 234 may be obtained directly from device. 180, either via querying device 180 directly, or device 180 updating criteria 234 dynamically at the behest of a user or based on commands in a packet 232. An extensive list of criteria 234 which may be used in the selection of packets 232, and means of obtaining and updating these criteria 234, will be obvious to those of ordinary skill in the art.

More specifically, one of the criteria 234 on which the delivery of packets 232 may be based is the location of the device 180 to which content (e.g. comprised by packets 232) is being delivered. As discussed above, it may be desirable to interact with device 1$0 (e.g. deliver content to device 180, or restrict certain content being delivered to device 180) based on the location of device 180.

To that end, attention is now directed to systems and methods for interacting with devices based on the location of the device. Embodiments of these systems and methods may allow a content delivery device or system to provide certain content to, or restrict certain content from being delivered to, a device based on the location of the device to be evaluated when a channel is requested by the mobile device. For example, a user at a device may request certain content; the location of the device may then be compared against an access control list defining a set or rules regarding. the content to determine if the requested content may be accessed from, or is suitable for, that location. If the content may be accessed from this location the content may be delivered, otherwise an error message, or other options, may be delivered to the device. Similarly, content may be delivered to a certain device based on the location of the device.

For example, a user at a device may request certain content and, based on the location of the device, content appropriate to that location may be delivered to the device.

Figure 4:
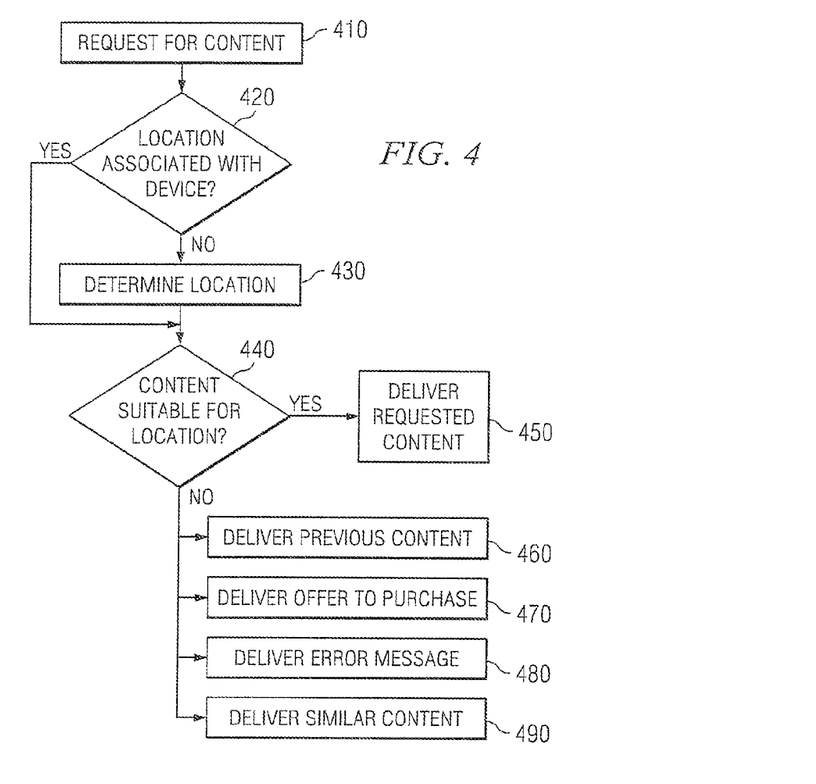
FIG. 4 is a flow diagram of an embodiment of a method for restricting the delivery of content based on the location of a device.

Turning now to FIG. 4, a flow diagram for one embodiment of a method for location based content restriction, is depicted. At step 410 a user at device 180 may send a request for content to a content delivery system operable to deliver content to device 180, such as media bridge 130. This request may include, for example a request to receive content corresponding to a channel of a television or radio broadcast, a particular application, etc. This request may, in turn, be received at the content delivery system (e.g. in one embodiment media bridge 130) operable to deliver content to the device 180.

Upon receiving the request it may be determined, at step 420, if a location is associated with the device 180 from which the request originated. More specifically, in certain embodiments, when a media player is installed on device 180 operable to play content delivered from media bridge 130 or a device is registered with a service such that content may be provided from media bridge 130 to the device, a unique identifier (e.g. a number unique with respect to all devices which may receive content from media bridge 130) may be assigned to the media player or the device 180. Media bridge 230 may keep a table in storage of the unique identifiers and a corresponding location associated with that unique identifier.

In one embodiment, whenever a device 180 is powered on and a media application on the device activated the media application may register its unique identifier with media bridge 130 and its location, such that media bridge 130 may maintain a table of active devices (e.g. unique identifiers of the active devices) and locations associated with the active devices. Additionally, the location may be updated at a certain interval, either by prompting from media bridge 130 or by the media application on the device 180.

Alternatively, in one embodiment, the unique identifiers of active devices are stored, but a location for a device may not be automatically registered or updated by the device 180. In this case, at step 420 a determination may be made if there is a location associated with the device from which the request was sent (or, for example, the currency of the associated location is outside a certain time window). If there is no location associated with the unique identifier of the device which initiated the request, or the location associated with the unique identifier has garbage values, the location of the device may be determined at step 430.

In one embodiment, media bridge may send one or more instructions to device 180 such that device 180 may perform a set of actions to determine its location and return this location to media bridge 130. Particularly, in one embodiment, the device 180 (or the operating system of the device) may provide an Applications Programming Interface (API) call from which a location, such as a latitude and longitude of the device, may be determined. Thus, the instructions sent from media bridge 130 may instruct the media application on the device to utilize this API call to obtain the latitude and longitude of the device and return this latitude and longitude to media bridge 130. Note that since, in the case, a location API is provided by the operating system of the device, it is somewhat irrelevant for the purpose of the invention how functionality of this provided API is accomplished by the device.

Many devices, however, do not provide such API calls. For these types of devices, the set of instructions sent from media bridge 130 may instruct the media application on the device to make a request based on a certain protocol (e.g.

Hyper Text Transfer Protocol or HTTP) to a gateway associated with a provider of service for the device (e.g. a gateway associated with base station 110). A response to this request from the gateway may comprise a header which may, in turn, comprise metadata pertaining to the request, response, device, etc. By parsing the header of the response to the request the latitude and longitude of the requesting device may be determined and this latitude and longitude returned to media bridge 130.

In another embodiment, this HTTP request may be directed to a server coupled to the gateway. The gateway may append a location request to the original HTTP request such, that the server receives the original request and the location request. The server may then return the location information pertaining to the device to the gateway, which returns this location information to the device, by for example, placing the location information in a header of an ETTP response.

It will be apparent that the determination of the location of the device at step 430 may be accomplished in a variety of methods, and an appropriate methodology may be selected or utilized based on factors associated with a particular implementation of an embodiment of the invention such as the capabilities of the particular device, the carrier network on which the device is running, etc. For example, certain devices may have an internal Global Positioning System (GPS) locator. Where an antenna inside of that device may pick up GPS signals and the device does GPS decoding, such that a location of the device may obtained in this manner. In another embodiment, the device may make a request for its location from a network with which it interfaces or the network may determine the location of the device using triangulation based on signal strength. In still other embodiment, the location of the device may be stored on the device, such that the location can be accessed and reported to media bridge 130, etc.

Referring still to FIG. 4, once the location has been determined and returned to, or obtained by, media bridge 130 it may be associated with the unique identifier for the device. As described above, however, this location information may comprise a longitude and latitude. When determining a location at step 430, then, it may be desired to associate the latitude and longitude of a device with one or more geographical regions, where the geographical regions may correspond to certain geographically defined features, such as a postal zip code, city limits, a congressional district, etc. These geographical regions may be defined by a polygonal space where the vertices of the polygon are defined by a latitude and longitude (e.g. media bridge may maintain a database of regions defined by a set of vertices). Thus, it can be determined if the latitude and longitude returned by the device lies on, or within, the geographical region defined by the vertices of the polygon, and a corresponding geographical region identified for the device. This geographical region may then be associated with the unique identifier for the device in lieu of, or in addition to, the latitude and longitude of the device. It will be apparent that more than one geographical region may be identified and associated with a particular device, for example a device may be associated with a particular postal zip code and city.

It should also be noted that other methods may be utilized to assign a user to a geographic region. For example, geographic regions may have a centroid (e.g. a two-dimensional center) that can be specified in latitude/longitude coordinates. Thus, in this case, media bridge 130 may store a table of region-centroid pairs. A region can then be associated with the unique identifier of a device by assessing which centroid is closest to a latitude and longitude of the device. Additionally, if the distance from the device from the nearest centroid (e.g. distances between points represented by respective latitude and longitudes) is greater than some configurable threshold it may be determined that the device (e.g. unique identifier for the device) should not be associated with that region or possibly any other region.

Once the location of the device has been determined, or obtained, it may be determined at step 440 if the content requested by the device may be delivered to the device based on the current location of the device. In one particular embodiment, content which may be delivered by media bridge 130 to various devices may be associated with a default rule and an access control list. The default rule may be a default access for the associated piece of content, for example a default of available may mean that this content may be delivered barring any exceptions to the default rule, while a default rule of restricted may indicate that the content is not to be delivered unless an exception to the default rule exists.

An access control list associated with the content may include a set of exceptions to the, default rule for the content. In particular, the access control list may comprise a set of geographical regions or sets of latitude and latitudes which comprise a set of exceptions to the default rule for the associated content. In other words, if the default rule for the content is available, the set of exceptions may indicate geographical regions where the content is not to be delivered at that time. Conversely, if the default rule for the content is restricted the set of exceptions may indicate geographical regions where the content may be delivered at that time.

As the rules pertaining to the access of various content may change quite rapidly according to a variety of conditions or criteria and an explicit rule for each piece of content with respect to multiple regions may be a very long list to manage and parse, an access control list coupled with a default rule may be easier to update and thus allow for greater ability to dynamically adjust the availability of a piece Of content to a device. More specifically, an access control list with a default rule may allow for management by exception when defining content access rights. Exceptions to the default rule may be defined instead of explicitly indicating for each possible region whether or not access to content is, or is not, allowed.

Based on an evaluation of a default rule and access control for the requested content, then, it can be determined, at step 440, if the requested content should be delivered to the device. If the determination is made that the requested content can be delivered to the device, media bridge 130 may commence delivering the requested data to the device at step 450.

If, however, it is determined that the requested content should not be delivered to the device (e.g. the device is in a location to which the requested content should not be delivered) media bridge 130 may take a variety of actions, a sampling of which are depicted in the embodiment of FIG. 4.

Namely, media bridge 130 may deliver content that was previously being delivered to the device before the device issued the request at step 460, or media bridge 130 may deliver new content (which is not the requested content) similar to the requested content (e.g. a N.Y. Mets game instead of the requested Yankees game) at step 490. Alternatively, an offer to purchase the requested content, along the lines of a pay per view arrangement, may be delivered to the device at step 470. Media bridge 130 may also deliver an error message to the device notifying the user of the device that the requested content cannot be delivered to the device at step 480.

As can be seen from the above description of embodiments of the invention, the delivery of content to a user may be restricted based on the location of the user's device. However, once a location for a device is obtained or known, almost any type of content sent to a device may then be tailored to the location of the device. In other words, restriction of the delivery of certain content based on the location of the device is only a microcosm or embodiment of the systems and methods of the present invention, which are also capable of delivering content to a device based on the location of the device.

Tailoring the content delivered to a user, or a user experience to the location of a user is highly desirable. In the past, a user at a device, such as a computer surfing the Internet may have navigated to a certain site which requests the location, city, zip code of a user. When or if the user gives the web site some information about his location, it can remember that information and use it later on to customize your experience. So, for example, with "Craig's List", if a user informs the web site that his location is Austin, the web site will give the user the listings for the Austin area. However, with these types of system there is no ability to do customization of the content delivered to a user of a device based on a determination of the location of the device, for example autonomously delivering a piece of content based upon the occurrence of an event unrelated to the user.

The wide degree of usefulness and applicability of embodiments of the systems and methods of the present invention may be better illustrated with reference to a particular example. For instance, delivering a weather alert to a user based on the location of the user (e.g. the user's device) without any request or interference from the user.

Figure 5:
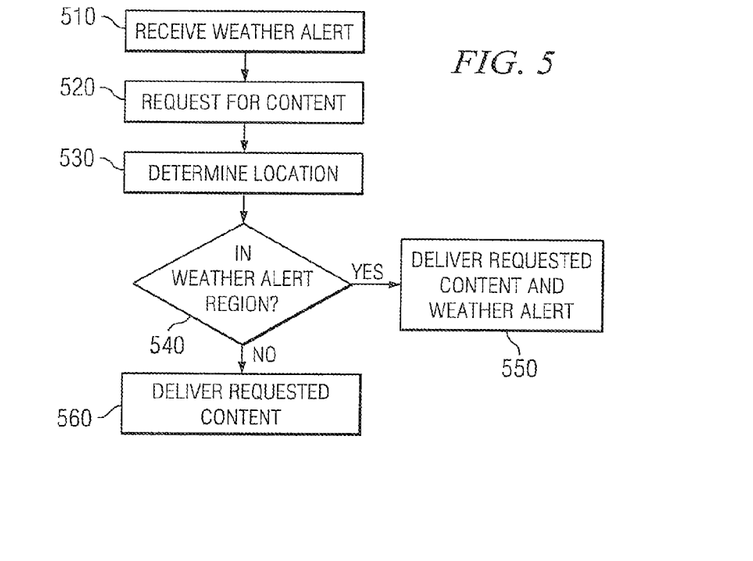
FIG. 5 is a flow diagram of an embodiment of a method for delivering a weather alert based on the location of a device.

Moving now to FIG. 5, a flow diagram for one embodiment of a weather application for giving weather alerts to users of devices is depicted. The steps for this embodiment may be implemented, for example, by software instructions comprising a weather alert module running on media bridge 130.

At step 510 a weather alert for a certain region may be received at media bridge 130 from a weather service, etc. This weather alert and regions associated with this weather alert may be stored. Thus, a database may exist with a set of outstanding weather alerts and regions associated with each of the weather alerts.

At step 520 a request for content may be received from a device. The location of the device may then be determined at step 530, as discussed above with respect to FIG. 4. More particularly, one or more regions in which the device is located may be stored on media bridge 130 or may be determined upon receiving the request. The location (e.g. regions) of the device may then be compared against the regions or locations associated with the weather alerts at step 540 to determine if the device is in a location or region for which a weather alert has been issued. If the determination is made that the device is in such a location, a weather alert may be sent to the device along with the requested content at step 550, while only the content itself may be delivered at step 560 if the device does not lie within such a region or location. It will be apparent that certain steps of the embodiments depicted in FIG. 5 (and the other FIGURES as well) may not occur in other embodiments. For example, the received weather alert may be delivered to all devices associated with the region for which the weather alert was issued irrespective of whether a request for content. (STEP 520) has been received from a device. In other words, the weather alert may be a delivered to a device autonomously (e.g. without. involvement of the device) by a content delivery system or device.

The same sort of methodology depicted with respect to the embodiment of FIG. 5 can be utilized for a whole host of applications operable to deliver content to a device based on the location of the device, where the content may be apropos, or related to, the location of the device. For example, traffic information may be delivered to the user of a mobile device based on the location of the mobile device, or the local affiliate of a nationwide broadcast network delivered to .a user based on his location, etc. More commercially oriented applications may also be implemented. For example, advertising may be targeted and delivered to a user based' on the location of the user's device. For example, at, some point during the delivery of content to a device it may be desirable for media bridge 130 to deliver an advertisement or commercial to the device. A commercial to be delivered to the device may be chosen by media bridge 130 based on the location of the device and thus different ads may be delivered to users at devices based on the location of each of the devices, even though each of the users may be viewing the same (or different) content.

Figure 6:
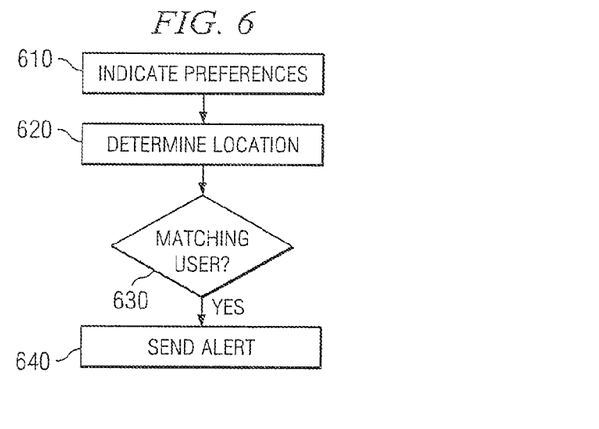
FIG. 6 is a flow diagram of an embodiment of a method for implementing a dating application based on the location of one or more devices.

The location of a device may also be used to spur or trigger interaction between users of devices located in the same region or regions in close proximity to one another. FIG. 6 depicts a flow diagram of one embodiment of a dating application for linking users of devices in the same region or regions in close proximity to one another. Again, the steps for this embodiment may be implemented, for example, by software instructions comprising a dating module running on media bridge 130.

At step 610 a user of a device may indicate his dating preferences (e.g. sex, body type, religion etc.). These preferences may be sent to media bridge 130, where they may be stored and associated with the unique identifier corresponding to the device (discussed above). At step 620 the location of the user's device can then be determined, as discussed above with respect to FIGS. 4 and 5. A determination can then be made at step 630 if another user (e.g. device or unique identifier) associated with similar or matching results is located with the same region, or a region within a certain distance of the region in which the user is located. If a matching user is located within a certain proximity of the user an alert may be sent to the user's device at step 640, where the alert may be a notification that a potential match is in the vicinity and an invitation to anonymously contact the matching user, etc. It will be apparent that, in some embodiments the determination at step 630 may be made at certain intervals, and that similar embodiments may be utilized for other purposes than dating, for example notification of designated friends in close proximity, family members, etc.

In addition to the above described embodiments of delivering content to a user based on the user's location, it will be apparent that similar methodologies may be used for other embodiments of the present invention which may deliver almost any type of content selected based on the location of the user. Some examples: embodiments of the present invention may be used for gaming. Specifically, a variety of users in proximity to one another be notified that they are playing the same game and asked to play interactively. Additionally, the physical location of one or more of the users may actually be used to affect the gaming experience itself. For example, the landscape in a game being played on a device may reflect the landscape of the location where the user of the mobile device is located. In one embodiment, a game may be written with a set of virtual landscapes. When the user is playing the game the location of the user's device may be determined and the gaming content delivered to the user by media bridge 130 may be selected based on the location of the device.

It will also be apparent that a variety of methodologies may be utilized for restricting or delivering content to one or more devices based on the location of these devices. In one particular embodiment, there may be a set of modules on media bridge 130 these, each module responsible for implementing a particular application. For example, one module may implement location based channel restriction, while one module may implement a dating application and yet another module may implement a gaming application etc. In this way the needs of a whole host of users may be met.

Figure 7:
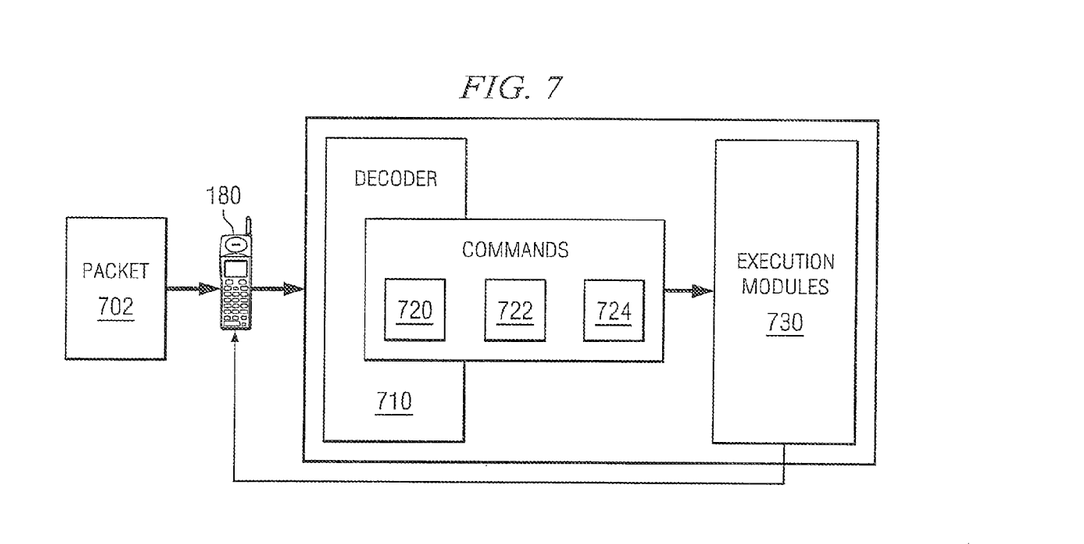
FIG. 7 is a depiction of an embodiment of the reception and processing of incoming packets by a mobile device.

After content, or packets thereof, are selected for delivery to a device, these packets may be sent to the device, where are they are received and processed. Turning to FIG. 7, an embodiment of the reception and processing of packets 232 by a mobile device is depicted. Mobile device 180 may receive packet 702 from media bridge 130 via base station 110. Decoder 710, on mobile device 180, may then extract each command 720, 722, 724 encapsulated in packet 702. In one embodiment, packet 702 may be in the data format described above where each command 720, 722, 724 is composed of a single character command identifier, followed by a 12 digit (zero-prefixed) length, followed by a data payload which is of this length. Decoder 710 identifies an encapsulated command 720, 722, 724 by identifying a tag and a corresponding payload using the length element of each command 720, 722, 724.

Decoder 710, on mobile device 180, may also receive command 720, 722, 724 encapsulated in packet 702. In one embodiment, a lower level protocol layer may extract commands 720, 722, 724 from packet 702 and present these commands to decoder 710. As discussed above, if multiple packets are utilized to deliver a portion of data, this portion may be assembled from the multiple packets by a lower level protocol layer and presented to decoder 710 such that decoder 710 receives a complete data portion in the data format described above.

For each command 720, 722, 724, decoder 710 may perform a corresponding action. In one embodiment, decoder may identify the type of command 720, 722, 724 using the associated tag. This command may then be passed to one of execution modules 730 based on the type of command 720, 722, 724.

In one particular embodiment, decoder 710 on mobile device 180 is implemented as a finite state machine which evaluates commands 720, 722, 724 based on the order in which commands 720, 722, 724 are encapsulated in packet 702 or are presented to decoder 710. For each command 720, 722, 724, decoder 710 may identify the type of command 720; 722, 724 using the associated command tag. If the decoder is able to execute command 720, 722, 724 it may pass command 720, 722, 724 to one of a set of execution modules 730, where command 720, 722, 724 may be executed and the state of mobile device 180 altered accordingly. When decoder 710 encounters a command 720, 722, 724 which it does not know how to evaluate decoder 710 may skip the remaining portion of this command using the length portion of the command to determine the start of the next command. By skipping unknown commands new command types may be added to a data format while still allowing legacy devices to process the data format.

It will be apparent that because embodiments of the data format discussed allow commands to be executed in the order encountered, a command may decoded and passed to an execution module for execution. During execution of this first command a second command may be decoded. This allows commands to be decoded and rendered more efficiently. For example, command 724 may be decoded and passed to execution modules 730 for execution. Simultaneously with the execution of command 724 decoder 70 may be in the process of decoding command 722.

However, as may be imagined, circumstances associated with device 180 may be substantially constantly variable, such that in some cases a large amount of data may be received. by device 180, while in other situations relatively little data may be received by device 180. This can cause problems with a multimedia player (e.g. a software application including a decoder and set of execution modules) on device 18p. When a large amount of data is received by device 180 a multimedia player may receive portions (e.g. sets of commands) faster than it can decode and execute the commands. Thus, a multimedia player may need to store these portions before they may be executed. If the condition persists to long, the amount of data received may require a large storage capacity. Conversely, if little data is received for a lengthy period, the multimedia player may run out of data to render, causing glitches in the presentation of data to a user of the device.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method, comprising:
receiving a request for a first media stream from a mobile device, the request received through a base station on a reverse link channel;
identifying a current location corresponding to the mobile device;
referencing access control information corresponding to the media stream, the access control information including a default rule indicating whether the first media stream may be accessed, the access control information also including an access control list indicating one or more exceptions to the default rule, each exception indicating one or more geographic regions, the default rule and the access control list together indicating whether the first media stream may be accessed from the current location at a current time;
identifying a plurality of packets associated with the first media stream, the plurality of packets including a first subset of packets encoded via a first video data encoding format at a first frame rate, the plurality of packets including a second subset of packets encoded via a second video data encoding format at a second frame rate;

selecting the first subset of packets for delivery to the mobile device through the base station by using a forward link channel upon determining that the first media stream may be accessed from the current location at the current time, wherein the first subset of packets is selected based on a set of criteria including bandwidth availability and preferences.

2. The method of claim 1, wherein the current location comprises a latitude and a longitude of the mobile device.

3. The method of claim 1, wherein the access control information comprises a plurality of regions.

4. The method of claim 1, wherein the access control information directs the request to a second media stream if the first media stream may not be accessed from the current location at the current time.

5. The method of claim 1, wherein the set of criteria further include user account information, type of device, and network configuration.

6. The method of claim 1, wherein criteria are updated dynamically as packets are selected for delivery to the mobile device.

7. The method of claim 6, wherein criteria are obtained by querying the mobile device.

8. The method of claim 6, wherein criteria are updated based on information in the request.

9. A system, comprising:
   a media bridge configured to receive a request for a first media stream from a mobile device, the request received through a base station on a reverse link channel and identify a current location corresponding to the mobile device;
   memory configured to maintain access control information corresponding to the media stream, the access control information including a default rule indicating whether the first media stream may be accessed, the access control information also including an access control list indicating one or more exceptions to the default rule, each exception indicating one or more geographic regions, the default rule and the access control list together indicating whether the first media stream may be accessed from the current location at a current time;
   a storage system configured to store a plurality of packets associated with the first media stream, the plurality of packets including a first subset of packets encoded via a first video data encoding format at a first frame rate, the plurality of packets including a second subset of packets encoded via a second video data encoding format at a second frame rate;
   wherein the first subset of packets are selected by a processor for delivery to the mobile device through the base station by using a forward link channel upon determining that the first media stream may be accessed from the current location at the current time, wherein the first subset of packets are selected based on a set of criteria including bandwidth availability and preferences.

10. The system of claim 9, wherein the current location comprises a latitude and a longitude of the mobile device.

11. The system of claim 9, wherein the access control information comprises a plurality of regions.

12. The system of claim 9, wherein the access control information directs the request to a second media stream if the first media stream may not be accessed from the current location at the current time.

13. The system of claim 9, wherein the set of criteria further include user account information, type of device, and network configuration.

14. The system of claim 9, wherein criteria are updated dynamically as packets are selected for delivery to the mobile device.

15. The system of claim 14, wherein criteria are obtained by querying the mobile device.

16. The system of claim 14, wherein criteria are updated based on information in the request.

17. A non-transitory computer readable storage medium, comprising:
   computer code for receiving a request for a first media stream from a mobile device, the request received through a base station on a reverse link channel;
   computer code for identifying a current location corresponding to the mobile device;
   computer code for referencing access control information corresponding to the media stream, the access control information including a default rule indicating whether the first media stream may be accessed, the access control information also including an access control list indicating one or more exceptions to the default rule, each exception indicating one or more geographic regions, the default rule and the access control list together indicating whether the first media stream may be accessed from the current location at a current time;
   computer code for identifying a plurality of packets associated with the first media stream, the plurality of packets including a first subset of packets encoded via a first video data encoding format at a first frame rate, the plurality of packets including a second subset of packets encoded via a second video data encoding format at a second frame rate;
   computer code for selecting the first subset of packets for delivery to the mobile device through the base station by using a forward link channel upon determining that the first media stream may be accessed from the current location at the current time, wherein the first subset of packets is selected based on a set of criteria including bandwidth availability and preferences.

18. The non-transitory computer readable storage medium of claim 17, wherein the current location comprises a latitude and a longitude of the mobile device.

* * * * *